(12) United States Patent
Fasone

(10) Patent No.: US 8,272,291 B2
(45) Date of Patent: Sep. 25, 2012

(54) STEERING COLUMN LOCKING DEVICE

(76) Inventor: Samuel Fasone, Westerville, OH (US)

( * ) Notice: Subject to any disclaimer, the term of this patent is extended or adjusted under 35 U.S.C. 154(b) by 436 days.

(21) Appl. No.: 12/688,438

(22) Filed: Jan. 15, 2010

(65) Prior Publication Data

US 2011/0174109 A1   Jul. 21, 2011

(51) Int. Cl.
*G05G 1/00* (2008.04)
(52) U.S. Cl. ............. 74/491; 74/492; 280/775; 280/777
(58) Field of Classification Search .............. 74/492, 74/493; 280/775, 777
See application file for complete search history.

(56) References Cited

U.S. PATENT DOCUMENTS

| | | | |
|---|---|---|---|
| 3,948,069 A | 4/1976 | Imbriano | |
| 4,029,168 A | 6/1977 | Kramer | |
| 4,232,571 A | 11/1980 | Kimberlin | |
| 4,287,786 A | 9/1981 | Berginski | |
| 4,318,288 A | 3/1982 | Rifat | |
| 4,538,435 A | 9/1985 | Romero | |
| 4,771,618 A | 9/1988 | Weber et al. | |
| 4,811,580 A | 3/1989 | Jang | |
| 4,854,142 A | 8/1989 | Peitsmeier et al. | |
| 4,881,389 A | 11/1989 | Alfon et al. | |
| 4,934,209 A | 6/1990 | Dewitt et al. | |
| 5,460,021 A | 10/1995 | Taylor | |
| 5,647,818 A * | 7/1997 | Moody | 477/99 |
| 5,718,131 A | 2/1998 | Bobbitt, III | |
| 5,751,073 A | 5/1998 | Ross | |
| 5,793,122 A | 8/1998 | Dingwall et al. | |
| 5,848,540 A | 12/1998 | Pieper | |
| 5,869,908 A | 2/1999 | Moczygemba et al. | |
| 5,906,120 A | 5/1999 | Thacker et al. | |
| 5,937,500 A | 8/1999 | Bobbitt, III | |
| 5,992,191 A * | 11/1999 | Nickeas et al. | 70/218 |
| 6,324,878 B1 | 12/2001 | Ramamurthy et al. | |
| 6,382,004 B1 * | 5/2002 | Jameel | 70/252 |
| 6,508,090 B1 * | 1/2003 | Hasegawa et al. | 70/247 |
| 6,647,751 B2 | 11/2003 | Zillmann | |
| 6,779,371 B1 | 8/2004 | Pieper | |
| 6,945,377 B2 * | 9/2005 | Burr et al. | 192/220.2 |
| 7,009,479 B1 | 3/2006 | Chung et al. | |
| 7,010,996 B2 | 3/2006 | Schick et al. | |
| 7,062,944 B2 | 6/2006 | Gaeth et al. | |
| 7,215,237 B1 | 5/2007 | Messerschmid et al. | |
| 7,234,328 B2 | 6/2007 | Okuno et al. | |
| 7,316,138 B2 | 1/2008 | Goshima et al. | |
| 7,327,050 B2 | 2/2008 | Koga et al. | |
| 7,364,198 B2 | 4/2008 | Peppler | |
| 7,406,845 B2 | 8/2008 | Wise et al. | |

* cited by examiner

*Primary Examiner* — David M Fenstermacher
(74) *Attorney, Agent, or Firm* — Roger A. Gilcrest

(57) ABSTRACT

A steering column locking device. More specifically, a steering column locking device for golf carts, and the like.

13 Claims, 10 Drawing Sheets

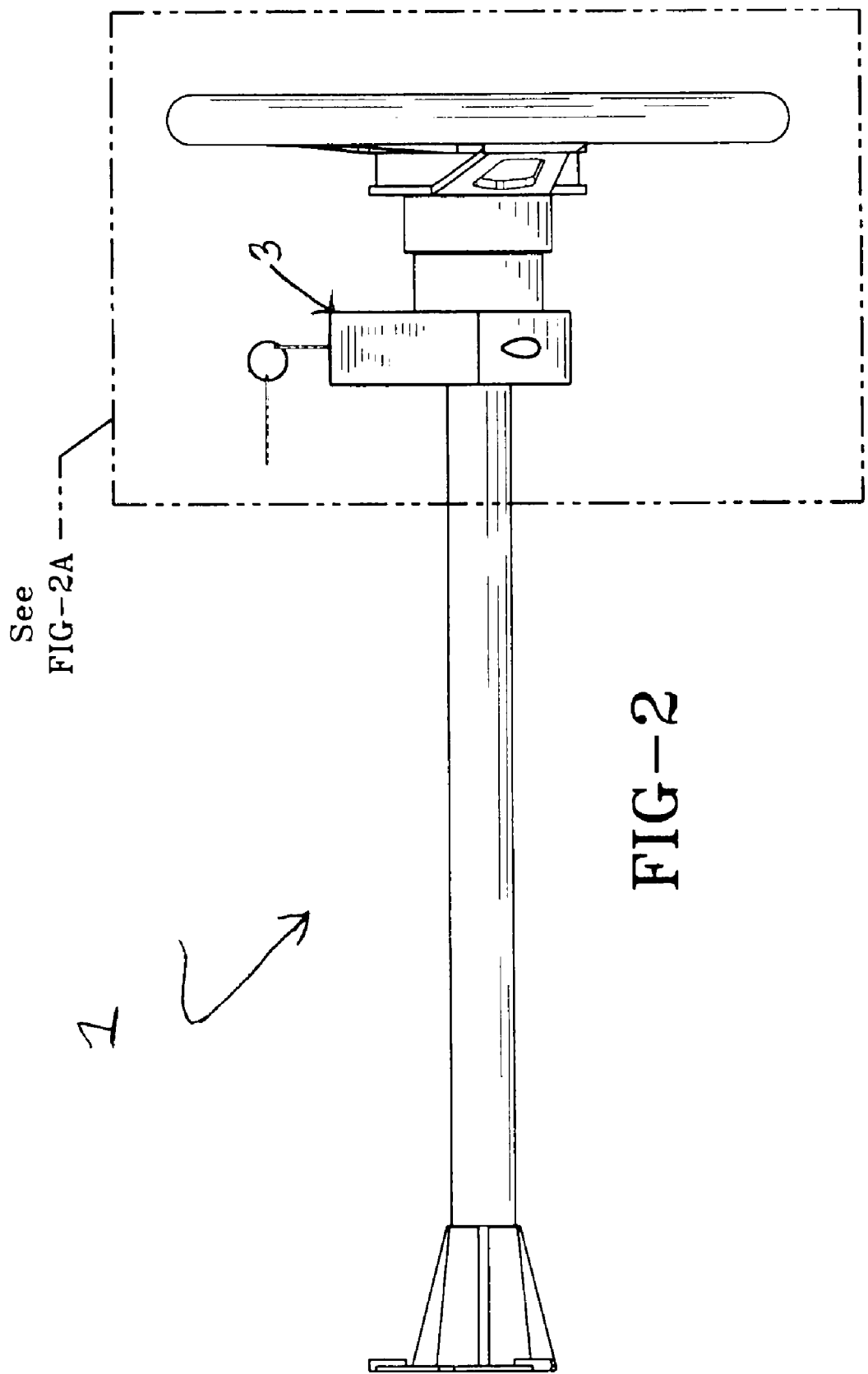

STEERING COLUMN LOCKING DEVICE

FIELD OF THE INVENTION

This invention relates to a steering column locking device. More specifically, this invention relates to a steering column locking device for golf carts, and the like.

BACKGROUND OF THE INVENTION

Steering column locking devices are used to prevent vehicle theft. While many such devices have been created for automobiles, relatively few theft protection devices for golf carts exist. One such example of a golf cart anti-theft device is described in U.S. Pat. No. 5,460,021 and is hereby incorporated by reference. Multiple examples of steering column lock devices for automobiles are described in U.S. Pat. No. 7,234,328 B2, U.S. Pat. No. 7,364,198 B2, and U.S. Pat. No. 7,316,138 B2, which are hereby incorporated by reference.

Unless securely locked inside a building, golf carts remain substantially unprotected against theft. Further, steering column locking devices for automobiles cannot simply be transferred to a golf cart. Differences in the size and shape of the respective vehicles' steering columns create just one of the difficulties presented in attempting to use an automobile steering column locking device on a golf cart.

Accordingly, there remains a need for a steering column locking device that may be used on golf carts to effectively prevent theft.

SUMMARY OF THE INVENTION

The embodiments of the invention and the method described herein address the shortcomings of the prior art.

In general terms, the invention may be described as including the following:

A steering column comprising: (a) a sleeve portion having an open bore or space extending the length of said sleeve portion; (b) a steering shaft portion disposed within the sleeve portion, and adapted to rotate within said sleeve portion, and having at least one terminal end portion extending beyond the sleeve portion; (c) a main body portion fixed about the sleeve portion having (i) a central aperture extending through the main body adapted to receive the sleeve portion; (ii) a groove about the central aperture extending partially through the main body; (iii) a locking aperture extending through the main body and extending into the groove; (iv) a locking mechanism extending through the locking aperture so as to allow all or some portion of the locking mechanism to extend through the groove, which locking mechanism is adapted to be reversibly removed; (d) a second body portion having (i) a perimeter wall, (ii) a bottom end, and (iii) a top end; (iv) at least one side opening extending partially or completely through the perimeter wall and positioned so as to allow the locking mechanism of the main body portion to extend into the at least one side opening; the bottom end having a portion extending into the groove of the main body portion, the bottom end being adapted to rotate with respect to the main body portion between an unlocked position wherein the locking aperture and the at least one side opening are not aligned and a locked position wherein the locking aperture and the at least one side opening are aligned; and the top end having an opening.

The sleeve portion may be any material such as a metal or a high strength plastic of sufficient strength for use in a security device of the type of the present invention. A number of different types of materials may be used for making the sleeve portion of the present invention. Preferably, the material is aluminum that can be cast or machined into the desired shape. The sleeve portion may be cylindrical in shape or alternatively may have multiple faces. Similarly, the steering shaft may be any material such as a metal or a high strength plastic. A number of different types of materials may also be used for making the steering shaft of the present invention. Preferably, the material is aluminum that can be cast or machined into the desired shape. The shaft may be cylindrical in shape or alternatively may have multiple faces.

In addition, the main body portion may be any stable material such as a metal or a high strength plastic. A number of different types of materials may be used for making the sleeve portion of the present invention. Preferably, the material is aluminum that can be cast or machined into the desired shape. It may be fixed about the sleeve portion by means which may include, but are not limited to, an adhesive, soldering, shim piece, or through the use of a fastener, such as a screw, preferably one that is designed for relatively secure attachment, such as one-way or counter-sunk screw, that are relatively difficult to remove.

The central aperture extending through the main body may be any shape to receive the sleeve portion, preferably such that the two pieces fit snugly and securely together, in accordance with the security function of the invention.

The groove about the central aperture may be circular, so as to allow rotational movement of the bottom end portion of the second body portion within the groove. Preferably, the groove should not extend through the main body portion such as would compromise the security function of the system of the present invention. However, there may be one or more optional openings in the groove, such that water and other materials that may enter the groove, and escape through the openings.

The locking aperture extends through the main body and into the groove. The aperture may also extend through the groove. The aperture may be any shape so as to receive the locking mechanism.

The locking mechanism may shaped so as to fit into the locking aperture and may be secured within the locking aperture by adhesion, soldering, use of an interferant member, such as a pin, or other means appropriate to the security function of the device. It may be secured within the locking aperture by a pin inserted into the main body, extending through the locking aperture and through a groove on the locking mechanism. The locking mechanism operates so as to extend through the locking aperture and into the groove, thus engaging the lock. The mechanism may have a safety feature, which allows the mechanism to lock in its engaged position, so as to require an additional action to remove the locking mechanism from the groove, thereby disengaging or unlocking the device.

The second body portion may be any material such as a metal or a high strength plastic. A number of different types of materials may be used for making the second body portion of the present invention. Preferably, the material is aluminum that can be cast or machined into the desired shape.

The second body portion may have at least one side opening extending partially or completely through the perimeter wall. The opening may be any shape such as to receive the locking member or mechanism when engaged and inhibit rotation of the bottom portion within the groove. The opening may be an aperture or may be an opening extending the length of the perimeter wall, or any combination thereof that will inhibit the rotational movement of the second body portion within the groove, when the locking mechanism is engaged.

The portion of the bottom end extending into the groove of the main body portion is circular in shape so as to allow it to rotate within the groove.

The present invention also includes an embodiment in which the opening in the top of the second body portion is shaped to receive the terminal end portion of the steering shaft portion and is fixed to the terminal end portion so as to cause the second body portion to rotate along with the rotation of the steering shaft portion. For example, the top may be triangular in shape or rectangular in shape. Accordingly, the terminal end portion will be a corresponding shape so as to fit into the top of the second body portion and cause the second body portion to rotate with the steering shaft portion.

In another embodiment, the terminal end portion of the steering shaft has one or more splines and the opening of the top end of the second body portion is shaped so as to receive the splined terminal end portion so as to cause the second body portion to rotate along with the rotation of the steering shaft portion. In other words, the engagement between the opening of the top end of the second body portion and the splined terminal end portion integrally rotates the second body portion with respect to the steering shaft.

The present invention also includes an embodiment wherein the top end of the second body portion comprises a removable portion that includes the opening of the top end. The removable portion and the portion of the second body portion from which the removable portion is removed may be threaded. Alternatively, the removable portion may be fixed in the second body portion by means which may include, but not limited to, adhesion or soldering.

In another embodiment, the central aperture is defined by at least one removable portion wherein the main body portion is shaped so as to hold removable portion(s) within the main body portion.

In yet another embodiment, the severable main body portion comprises a first portion and a second portion wherein the first portion is fixed to the second portion. The first and second portions may be fixed to one another by means including, but not limited to, one or more set screws, adhesion or soldering.

In another embodiment of the present invention, the terminal end portion of the steering shaft has one or more splines and second body portion is fixed to an adaptor having an aperture shaped so as to receive the splined terminal end portion so as to cause said second body portion to rotate along with the rotation of said steering shaft portion. In other words, the engagement between the aperture and the splined terminal end portion integrally rotates the second body portion with respect to the aperture.

The present invention also includes a locking system comprising: (a) a severable main body portion having (i) a central aperture extending through the main body; (ii) a groove about the central aperture extending partially through the main body; (iii) a locking aperture extending through the main body and extending into the groove; (iv) a locking mechanism extending through the locking aperture so as to allow all or some portion of the locking mechanism to extend through the groove, with such locking mechanism adapted to be reversibly removed; (b) a second body portion having (i) a perimeter wall, (ii) a bottom end, and (iii) a top end; (iv) at least one side opening extending partially or completely through the perimeter wall and positioned so as to allow the locking mechanism of the main body portion to extend into the at least one side opening; the bottom end having a portion extending into the groove of the main body portion, the bottom end being adapted to rotate with respect to the main body portion between an unlocked position wherein the locking aperture and the at least one side opening are not aligned and a locked position wherein the locking aperture and the at least one side opening are aligned; and the top end having an opening.

The severable main body portion may be any material such as a metal or a high strength plastic suitable to the security function of the device. A number of different types of materials may be used for making the sleeve portion of the present invention. Preferably, the material is aluminum that can be cast or machined into the desired shape.

The central aperture extending through the main body may be any shape to receive the sleeve portion. Further, the groove about the central aperture may be circular, so as to allow rotational movement of the bottom end portion of the second body portion within the groove. The groove normally should not extend through the main body portion; although, there may be one or more openings in the groove, such that water and other materials that may enter the groove, and escape through the openings.

The locking aperture extends through the main body and into the groove. The aperture may also extend through to the interior side of the groove. The aperture may be any shape so as to receive the locking mechanism.

The locking mechanism may shaped so as to fit into the locking aperture and may be secured within the locking aperture by adhesion, soldering, use of an interferant member, such as a pin, or other means appropriate to the security function of the device. It may be secured within the locking aperture by a pin inserted into the main body, extending through the locking aperture and through a groove on the locking mechanism. The locking mechanism operates so as to extend through the locking aperture and into the groove, thus engaging the lock. The mechanism may have a safety feature, which allows the mechanism to [lock] in its engaged position, so as to require an additional action to remove the locking mechanism from the groove, thereby un-engaging or unlocking the device.

The second body portion may be any stable material such as a metal or a high strength plastic. A number of different types of materials may be used for making the second body portion of the present invention. Preferably, the material is aluminum that can be cast or machined into the desired shape.

The second body portion may have at least one side opening extending partially or completely through the perimeter wall. The opening may be any shape such as to receive the locking mechanism when engaged and inhibit rotation of the bottom portion within the groove. The opening may be an aperture or may be an opening extending the length of the perimeter wall, or any [combination] thereof that will inhibit the rotational movement of the second body portion within the groove, when the locking mechanism is engaged.

The portion of the bottom end extending into the groove of the main body portion is circular in shape so as to allow it to rotate within the groove.

The locking system may also be such that the opening of the top end is shaped to receive a terminal end portion of a rotatable steering shaft and is fixed to the terminal end portion so as to cause the second body portion to rotate along with the rotation of the terminal end portion.

The present invention also includes an embodiment in which the opening of the top end of the second body portion is shaped to receive a terminal end portion of a rotatable steering shaft and is fixed to the terminal end portion so as to cause the second body portion to rotate along with the rotation of the terminal end portion. For example, the top may be triangular in shape or rectangular in shape. Accordingly, the terminal end portion will be a corresponding shape so as to fit into the top of the second body portion and the engagement between the two causes the second body portion to rotate with the terminal end portion.

The present invention also includes an embodiment wherein the terminal bore is shaped so as to receive a splined terminal end portion of a rotatable column so as to cause the second body portion to rotate along with the rotation of the terminal end portion. In other words, the engagement between the terminal bore and the splined terminal end portion integrally rotates the second body portion along with the rotation of the column.

The present invention also includes an embodiment wherein the top end of the second body portion comprises a removable portion that includes the opening of the top end. The removable portion and the portion of the second body portion from which the removable portion is removed may be threaded. Alternatively, the removable portion may be fixed in the second body portion by means which may include, but are not limited to, adhesion or soldering.

In another embodiment, the central aperture is defined by at least one removable portion wherein the main body portion is shaped so as to hold the at least one removable portion within the main body portion.

In yet another embodiment, the severable main body portion comprises a first portion and a second portion wherein the first portion is fixed to the second portion. The first portion may be fixed to the second portion by means which may include, but are not limited to, an adhesive, soldering, shim piece, or through the use of a fastener, such as a screw, preferably one that is designed for relatively secure attachment, such as one-way or counter-sunk screw, that are relatively difficult to remove.

BRIEF DESCRIPTION OF THE DRAWINGS

FIG. 2 is a side view of the steering column locking device, in accordance with one embodiment of the present invention.

DETAILED DESCRIPTION OF THE PREFERRED EMBODIMENTS

In accordance with the foregoing summary, the following describes a preferred embodiment of the present invention which is considered to be the best mode thereof. With reference to the drawings, the invention will now be described in detail with regard for the best mode and preferred embodiment.

Figure 1:
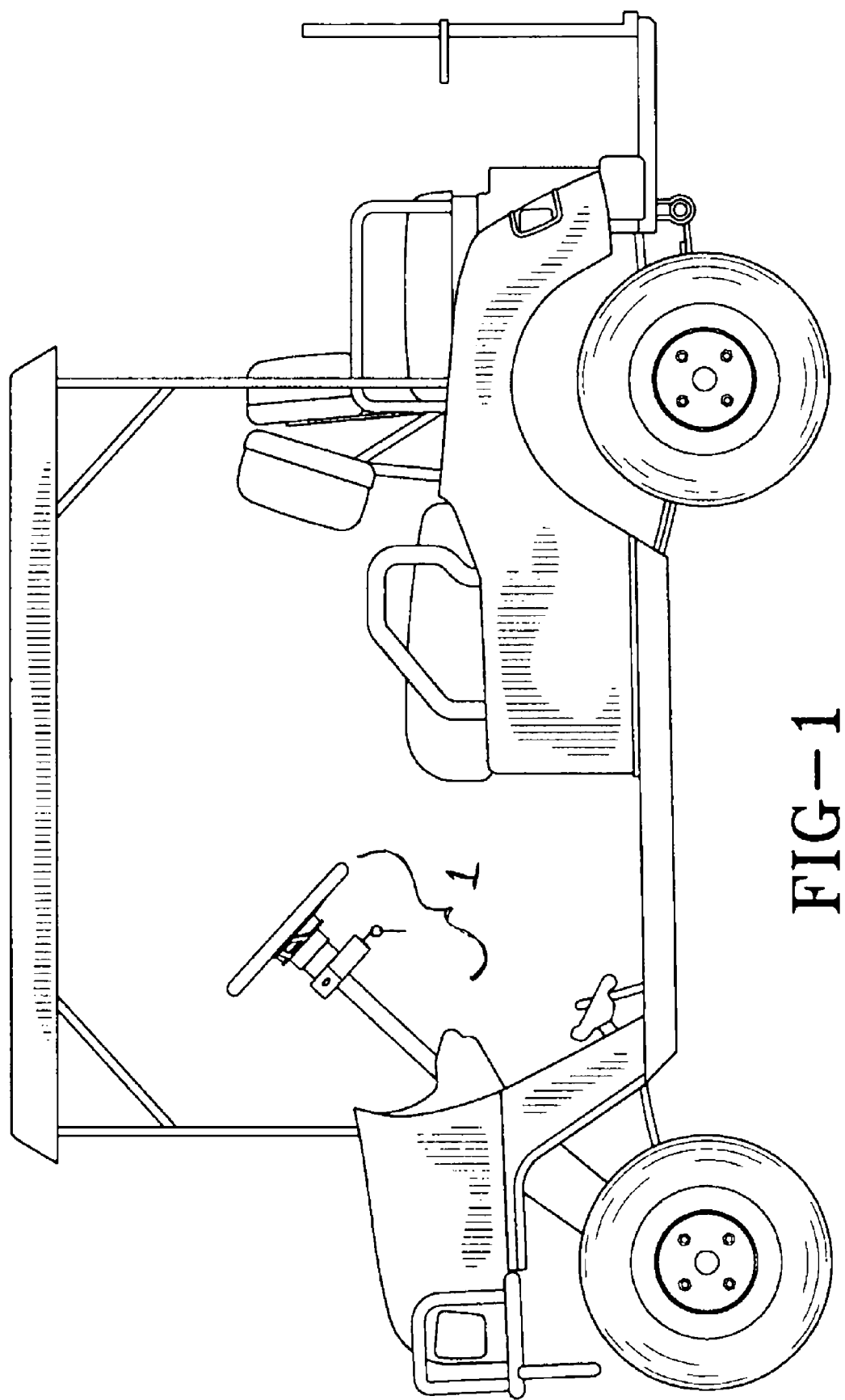
FIG. 1 shows the steering column locking device on a golf cart, in accordance with one embodiment of the present invention.

FIG. 1 shows steering column 1 on a golf cart.

FIG. 2 shows steering column 1 showing the position of main body portion 3 of a locking mechanism of the present invention.

Figure 2A:
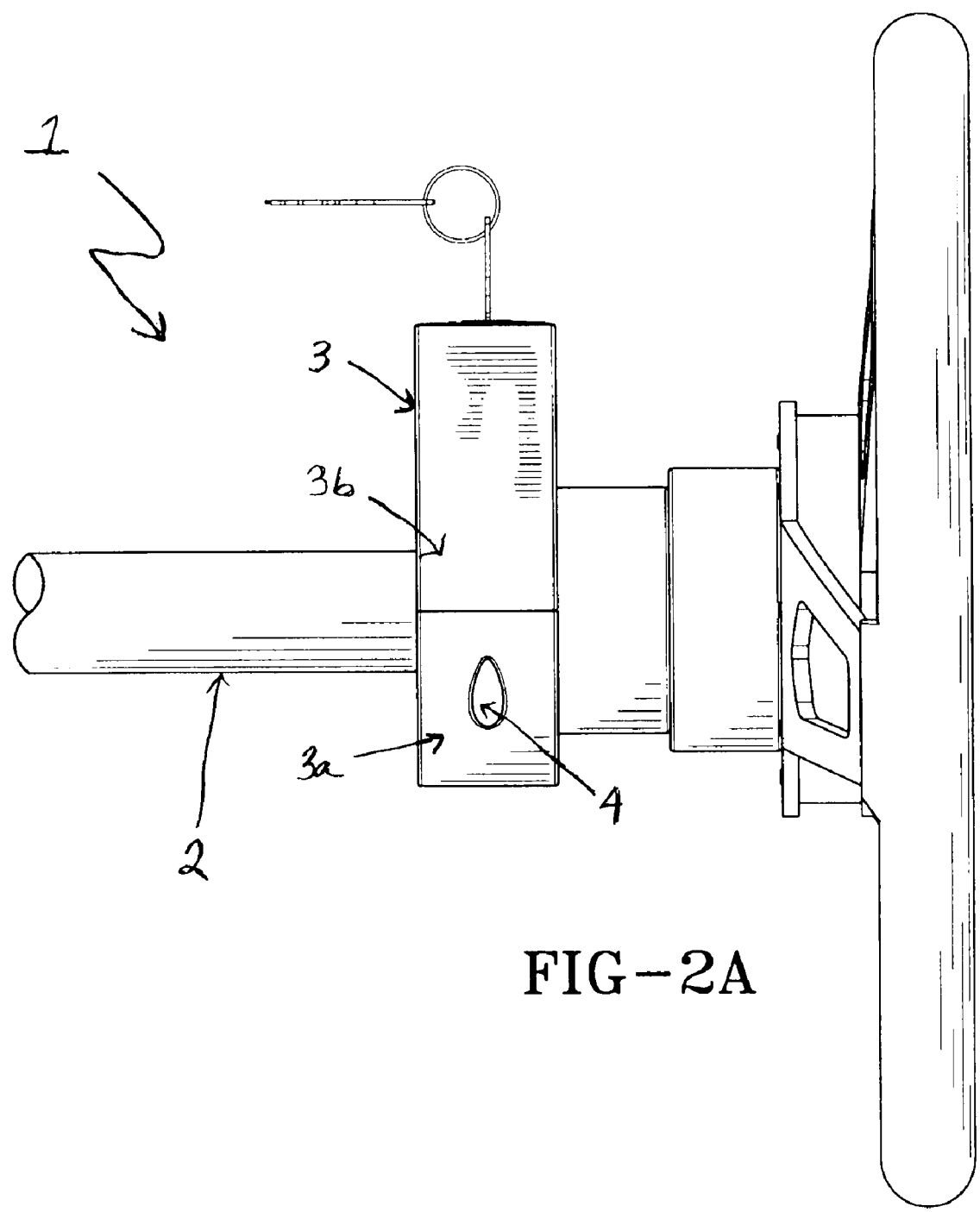
FIG. 2A is a detailed side view of the steering column locking device, in accordance with one embodiment of the present invention.

FIG. 2A shows a larger view of steering column 1 having a steering shaft portion 2 and main body portion 3 fixed about steering shaft portion 2. In the preferred embodiment, the main body portion will be fixed about the steering shaft portion by screws (not shown, but residing in counter sink aperture 4). The main body portion may be any stable material such as a metal or a high strength plastic. Preferably, the main body portion is 6061-T6 aluminum, machined into the desired shape. However, the present invention could also be constructed of a plastic that can be molded or machined into the desired shape.

FIG. 2A further shows main body portion 3 having portions 3a and 3b. In the preferred embodiment, main body portion 3 is machined into its desired shape, then divided into portions 3a and 3b by a machine. Preferably, portions 3a and 3b and fixed about steering shaft 2 and fixed to one another by screws (not shown, but residing in counter sink aperture 4). In the preferred embodiment, portions 3a and 3b are fixed to one another by tamper proof screws.

Figure 3:
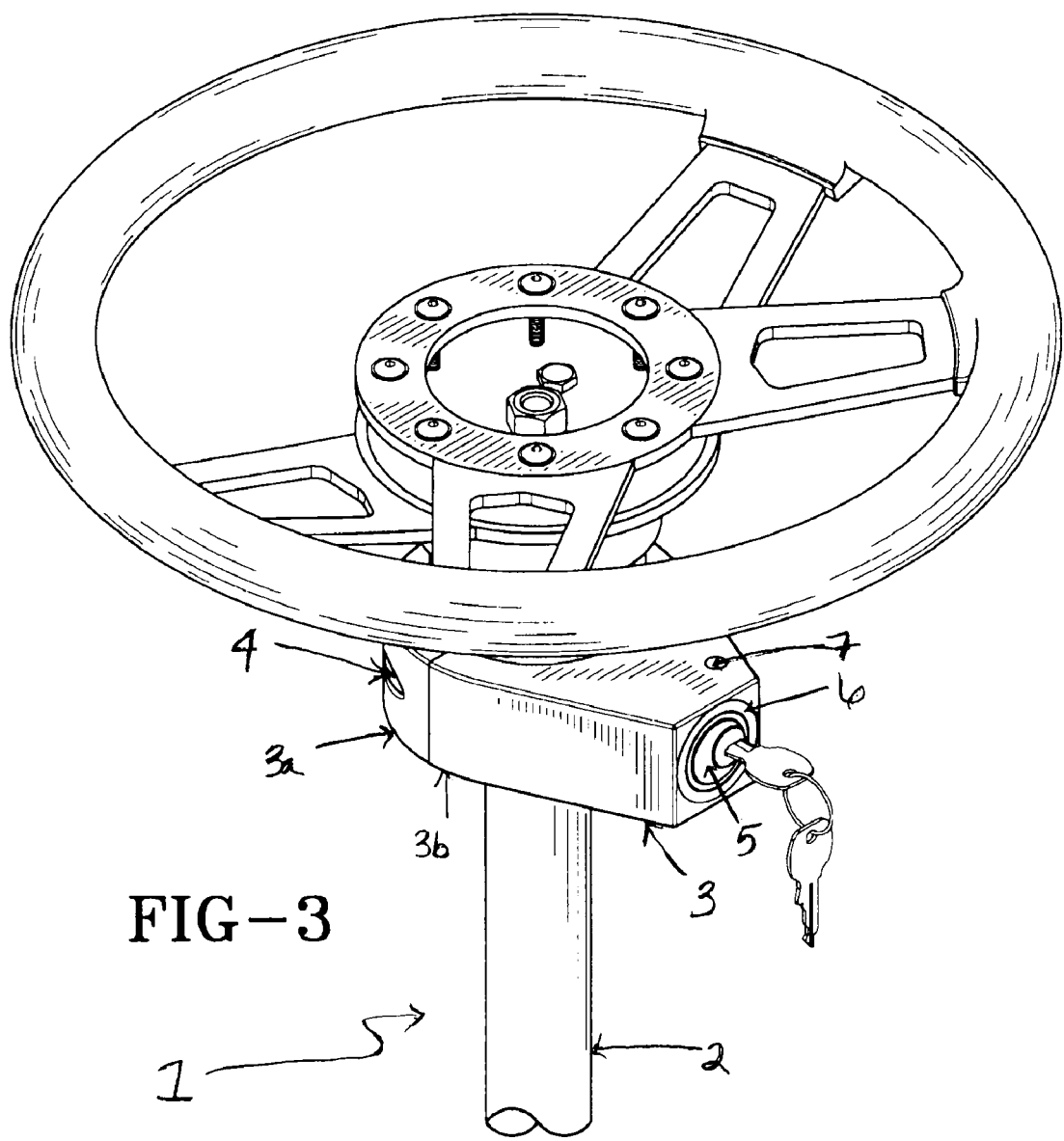
FIG. 3 is an perspective view of the steering column locking device.

FIG. 3 is an upper plan view of the present invention, showing steering column 1 having a steering shaft portion 2 and main body portion 3, having portions 3a and 3b, fixed about steering shaft portion 2. FIG. 3 also shows counter sink aperture 4.

FIG. 3 further shows locking mechanism 5 inserted into locking aperture 6. Finally, FIG. 3 shows locking pin 7. In the preferred embodiment, locking pin 7 is inserted into the main body portion 3, and passes through a groove on the outside of locking mechanism 5, thereby restricting movement of locking mechanism 5 with respect to the locking aperture 6, and preventing removal of the locking mechanism.

Figure 4:
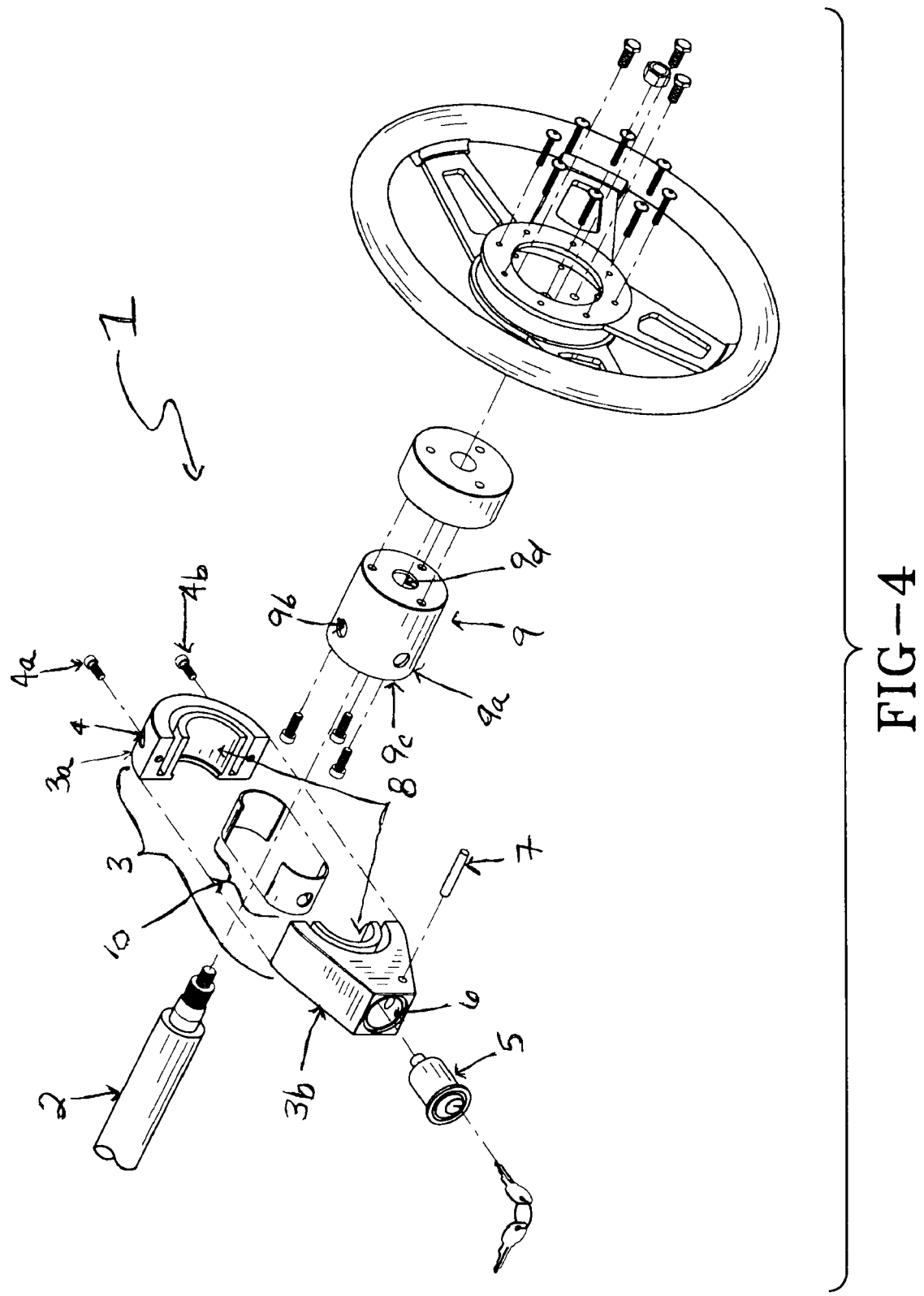
FIG. 4 is an upper side exploded perspective view of the steering column locking device, in accordance with one embodiment of the present invention.

FIG. 4 is an exploded view of the present invention and shows steering column 1, steering shaft portion 2, and main body portion 3 having a central aperture 8, defined when main body portions 3a and 3b are fixed to one another. FIG. 4 shows tamper proof screws 4a and 4b, which, in the preferred embodiment, are threaded so as to engage with correspondingly threaded counter sink aperture 4. FIG. 4 also shows locking mechanism 5, locking aperture 6, and locking pin 7

FIG. 4 also shows second body portion 9 having perimeter wall 9a, at least one side opening 9b, bottom end portion 9c, and top end opening 9d.

Figure 5:
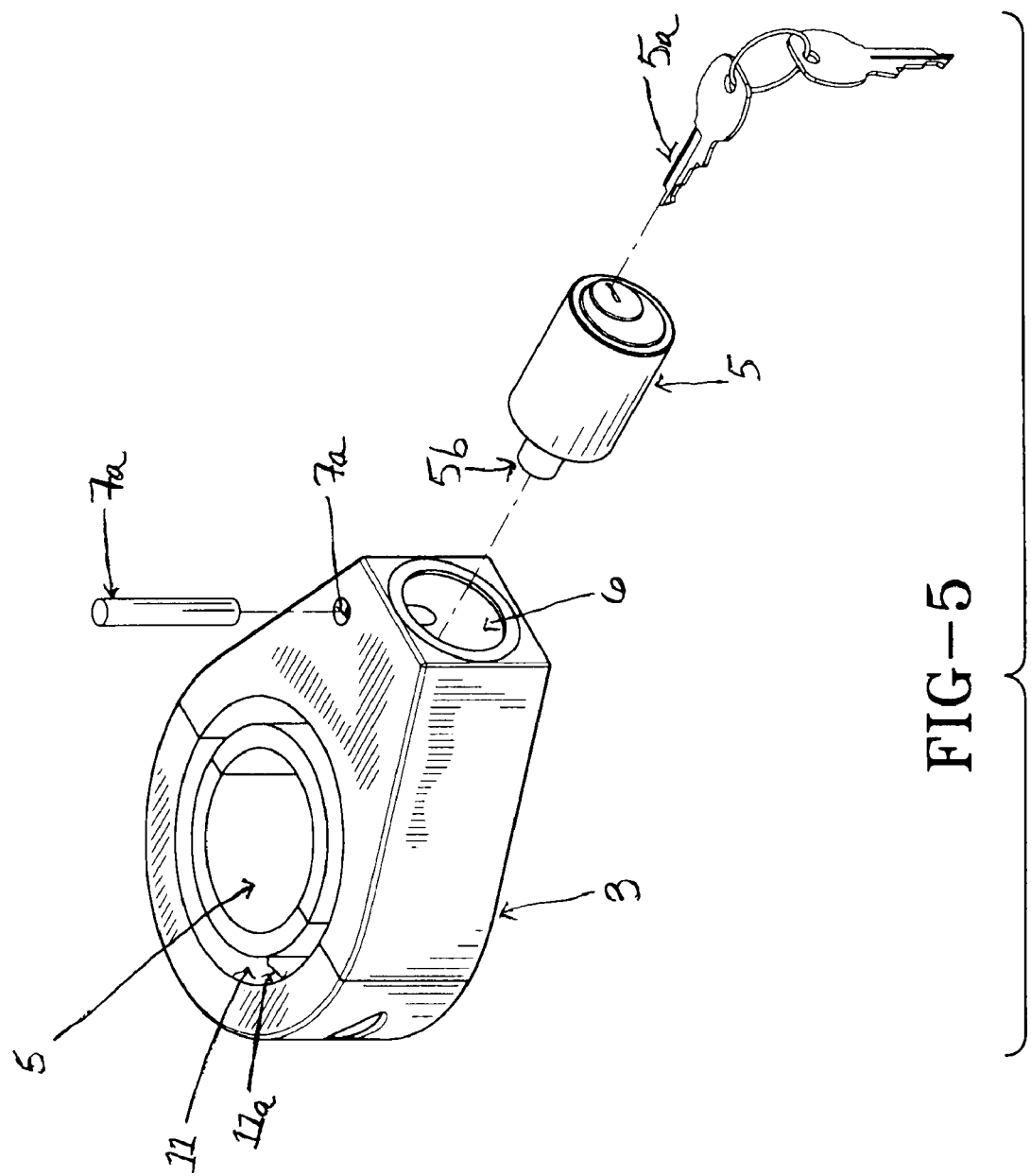
FIG. 5 is an exploded perspective exploded view of the main body portion and locking mechanism in accordance with one embodiment of the present invention.

In the preferred embodiment, the present invention has shim pieces 10, as shown in FIG. 4. Shim pieces 10 are placed inside central aperture of the main body portion, and provide a closer fit with the steering shaft. Preferably, the shim pieces are also made of machined aluminum, however, other materials such as metal or a high strength plastic may also be used. In the preferred embodiment, the central aperture will have a bottom lip, with the bottom lip having a slightly smaller diameter, such that shim pieces may fit inside the aperture without sliding through the aperture. The resulting diameter of the shim pieces will preferably have a diameter that corresponds to the out diameter of the steering shaft about which the main body portion is fixed FIG. 5 shows main body portion 3 having a central aperture 8. Preferably, the central aperture is machined out of the main body portion prior to the division of the main body portion into two portions. The aperture typically will have a diameter that corresponds to the outer diameter of the steering shaft about which it is fixed.

FIG. 5 also shows main body 3 portion having a groove 11. The groove 11 has a width 11a that is preferably large enough to accommodate the bottom end portion of the second body potion. Typically, the groove may be machined out of the main body portion. Further, in the preferred embodiment, the groove should not extend through the main body portion, as that would sever the main body portion. Instead, it should only extend into the main body portion, but not through. Additionally, in the preferred embodiment, there may be one or more openings in the groove, such that water and other materials that may enter the groove can escape through the openings.

FIG. 5 also shows locking aperture 6 and locking mechanism 5. In the preferred embodiment, the locking aperture opening is circular and the locking mechanism is cylindrical, with a circumference that corresponds to the locking aperture. In the preferred embodiment, the locking mechanism has a cylinder 5b which may extend and retract by the insertion and rotation of a key 5a into locking mechanism 5.

FIG. 5 also shows a locking pin 7 that is inserted into pin hole 7a. The locking pin passes through a groove in the locking mechanism, inserted into locking aperture, and inhibits the removal of the locking mechanism from the locking aperture. The pin may be inserted into the pin hole such that the top of the pin is flush with the main body portion, thus inhibiting easy removal of the locking mechanism.

Figure 6:
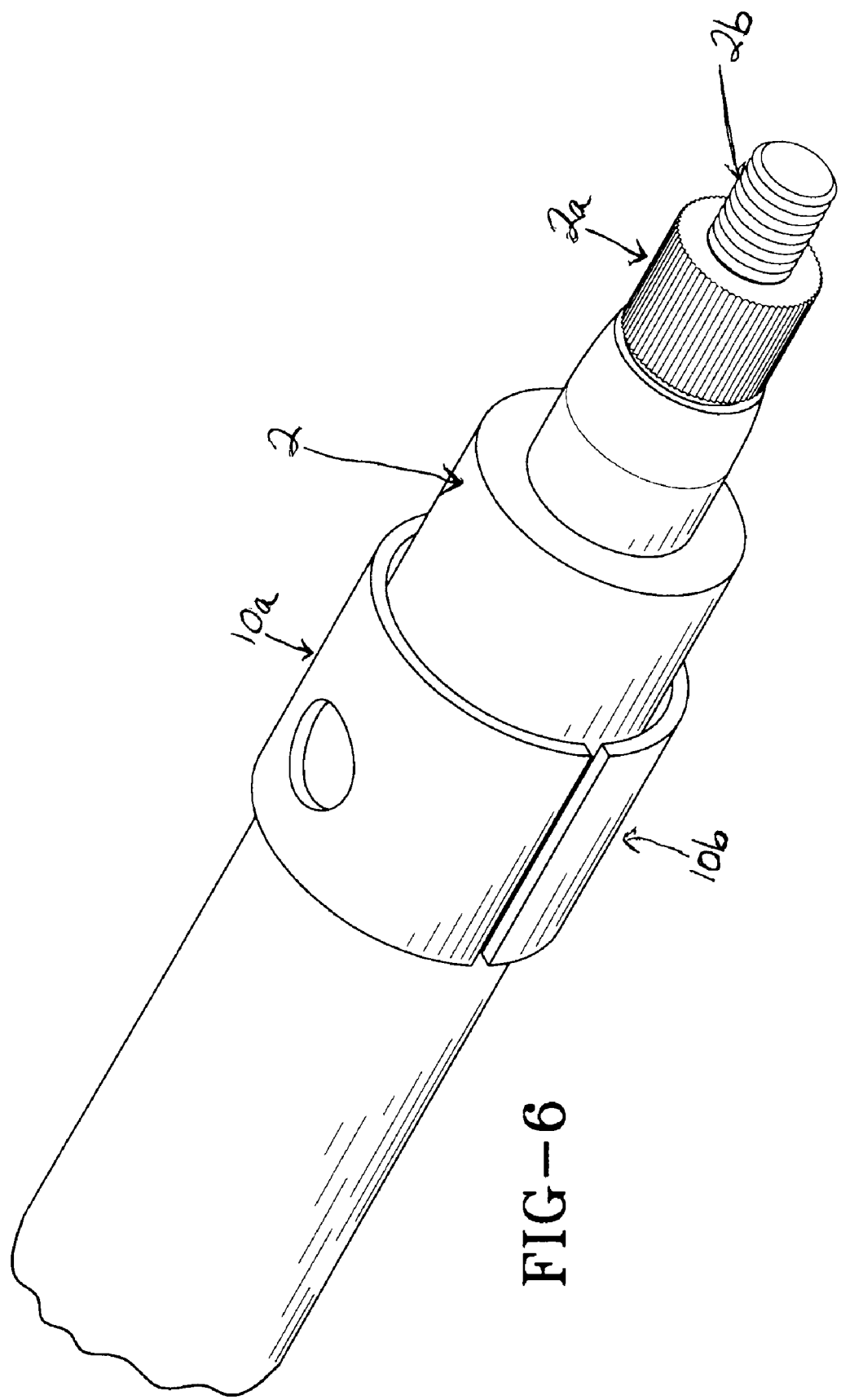
FIG. 6 is a side perspective view of the steering shaft and at least one removable portion in accordance with one embodiment of the present invention.

FIG. 6 shows steering shaft 2 having a splined section 2a and a threaded section 2b. In the preferred embodiment, splined section 2a inserts into an aperture with corresponding splines, thus causing steering shaft 2 to rotate with the steering wheel. A nut threads onto threaded section 2b to prevent the steering wheel from lifting off the splined section.

FIG. 6 also shows shim pieces 10a and 10b. The approximate circumference of the arcuate shim pieces corresponds to the shaft circumference. In the preferred embodiment, the shim pieces are held to the shaft by pressure from the main body portion.

Figure 7:
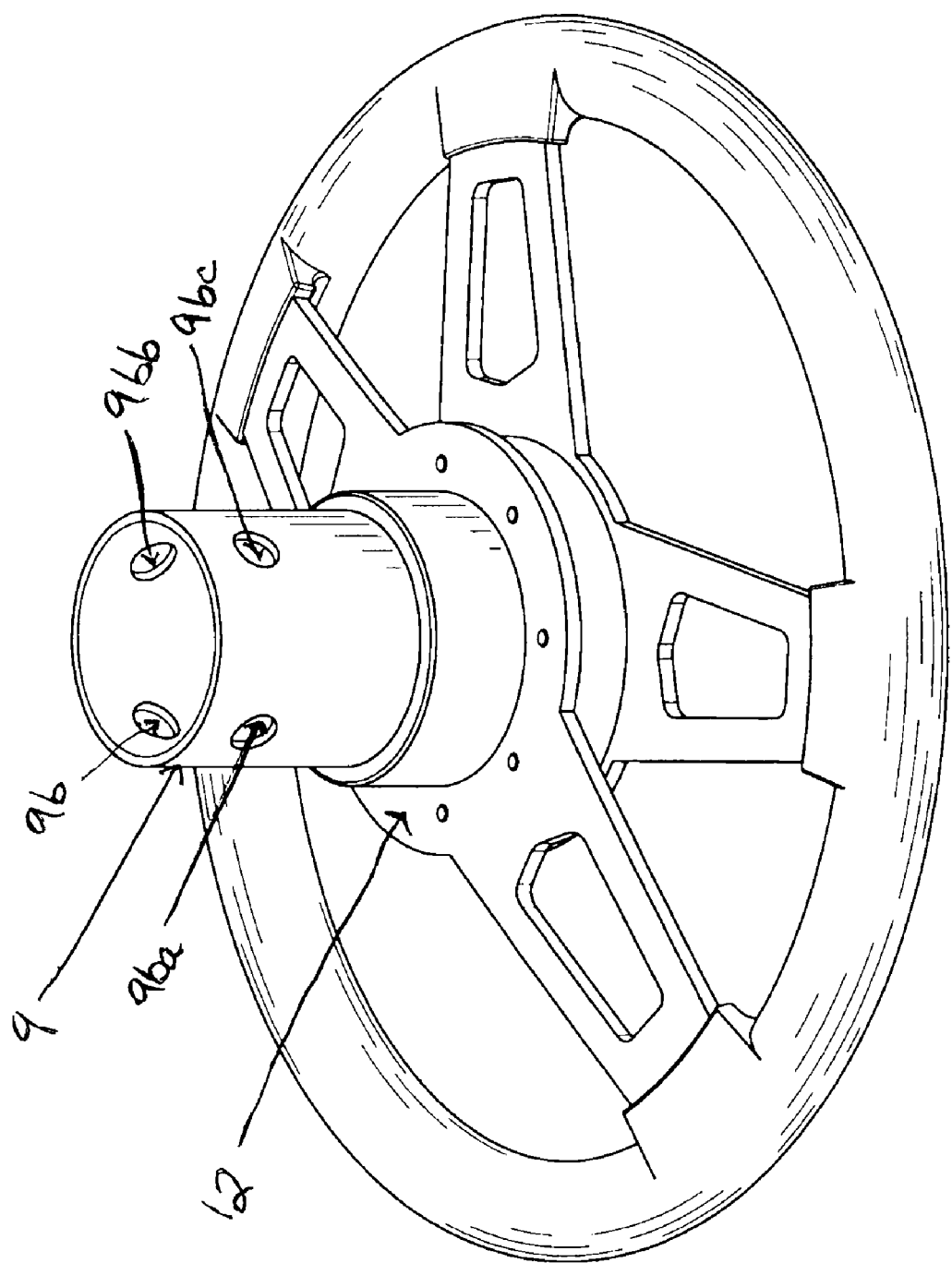
FIG. 7 is a bottom side perspective view of the second main body portion in accordance with one embodiment of the present invention.

FIG. 7 shows second body portion 9 attached to and steering wheel 12. Second body portion 9 has side openings 9b 9ba 9bb and 9bc. In the preferred embodiment, the side openings are slightly larger than the locking pin, so as to allow the locking pin to insert into the opening and thus inhibit the rotation of the steering shaft. In other embodiments, the openings may be larger, although that will allow greater rotational movement of the steering shaft when the locking mechanism is engaged. In addition, the openings may be larger longitudinally, which would allow leeway in mounting of the main body portion.

Figure 8:
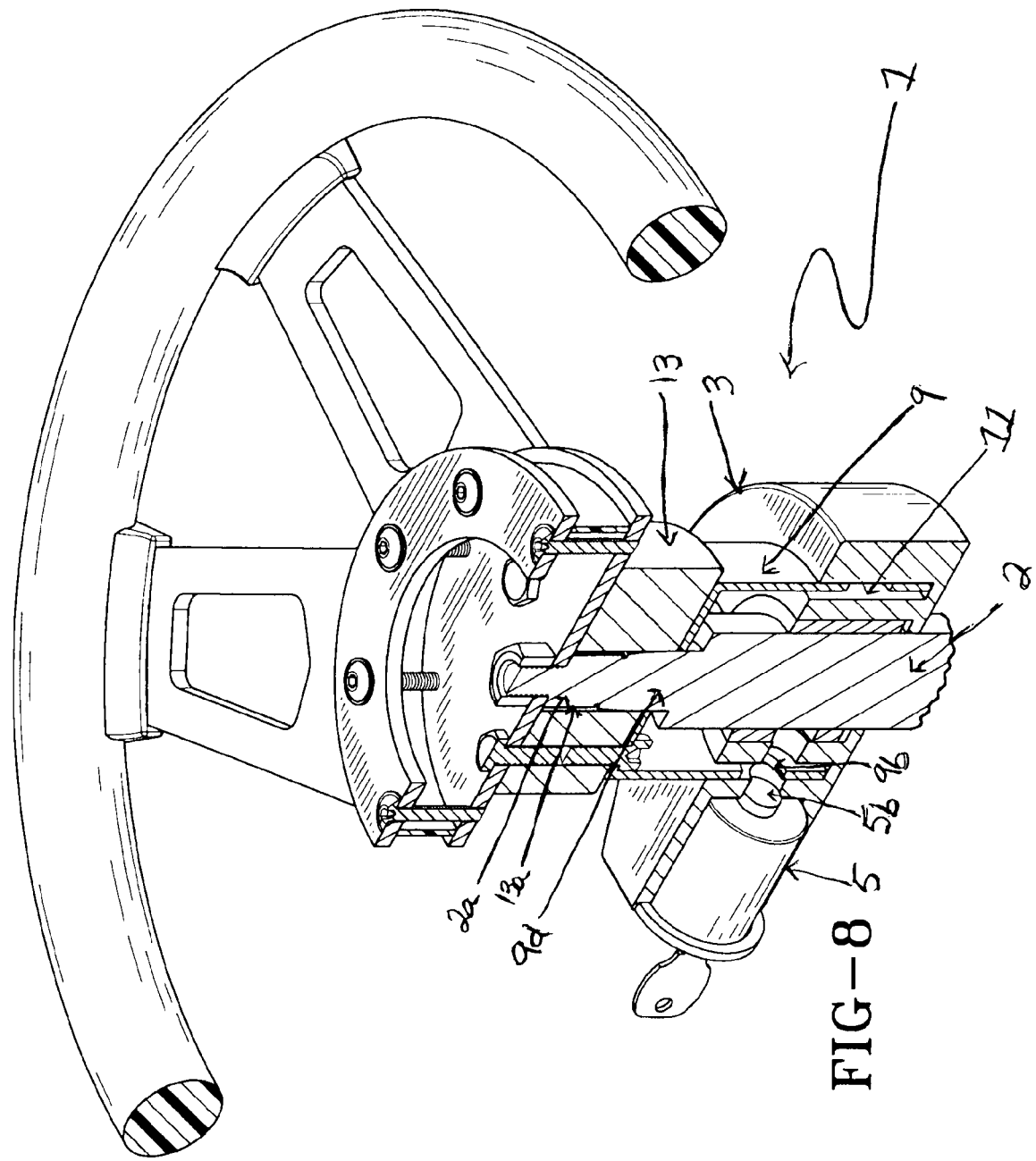
FIG. 8 is a cross sectional view of one embodiment of the present invention.

FIG. 8 shows a cross section view of the steering column 1. FIG. 8 shows locking mechanism 5 in the unlocked, unengaged position, as locking pin 5b is shown withdrawn from side opening 9b of the second body portion 9. Thus the second body portion is free to rotate within groove 11 of main body portion 3.

FIG. 8 also shows a third body portion 13 having a shaft opening 13a. FIG. 8 shows steering shaft 2 inserted through the top aperture 9d of the second body portion, into shaft opening 13a of the third body portion 13, where the splined portion 2a of steering shaft 2 is inserted into corresponding splined shaft opening 13a of third body portion 13.

Figure 9:
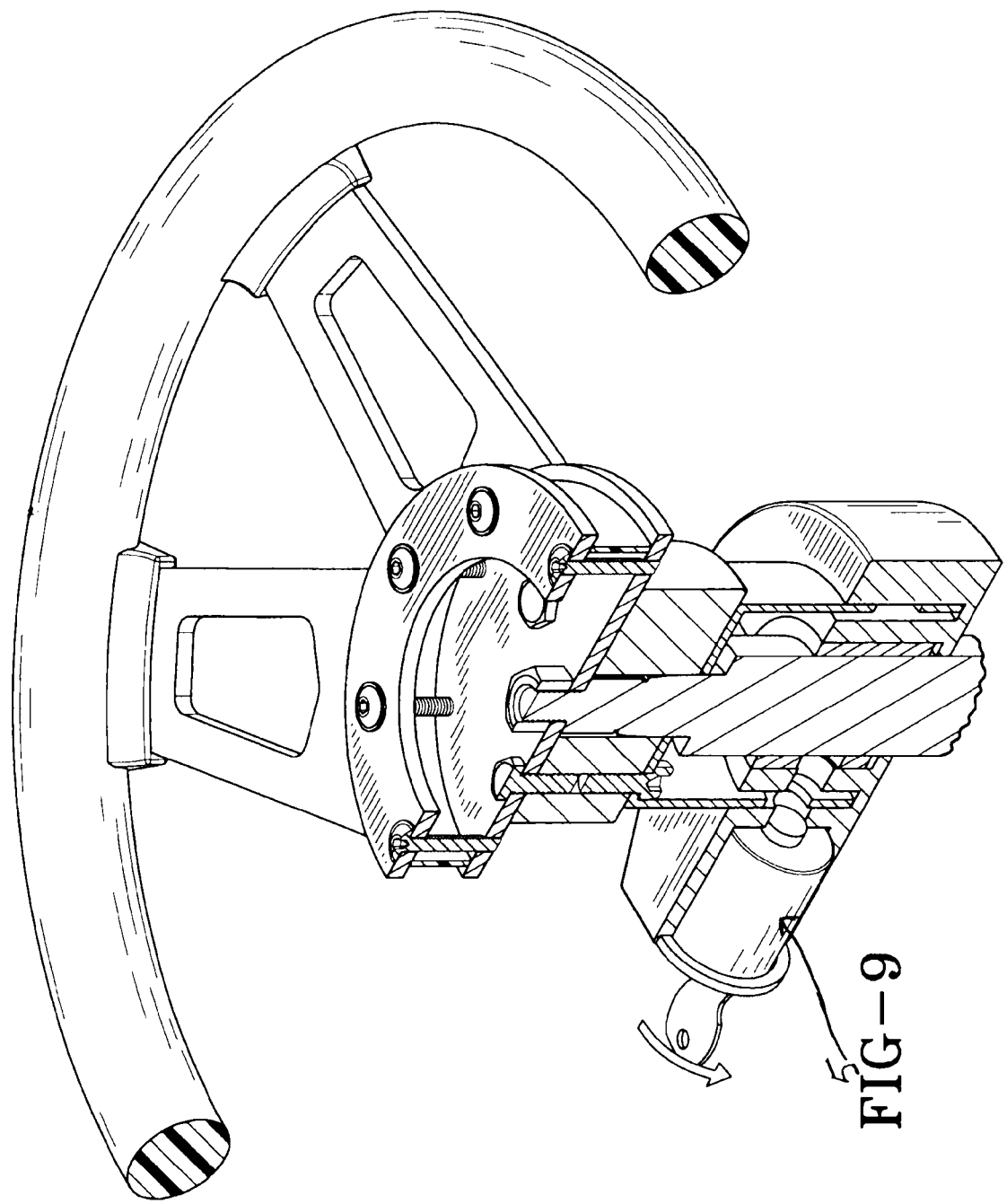
FIG. 9 is a cross sectional view of one embodiment of the present invention.

FIG. 9 shows a cross section view of steering column 1, but with locking mechanism 5 in the engaging. In the preferred embodiment, the locking mechanism operates to insert the locking rod into an opening in the second body portion, as a key is turned. The locking rod is reversibly removed when the key is turned in the opposite direction. In the preferred embodiment, the locking rod passes through the side opening of the second body portion, inhibiting rotational movement of the steering shaft. In another embodiment, the locking rod may enter the second body portion, but not pass all the way through. It is also possible for the locking rod to pass through the second body portion, through an opening on the main body portion and touch the steering shaft.

What is claimed is:

1. A steering column comprising:
   a. A sleeve portion having an open area extending the length of said sleeve portion;
   b. a steering shaft portion disposed within said sleeve portion adapted to rotate within said sleeve portion and having at least one terminal end portion extending beyond said sleeve portion;
   c. a main body portion fixed about said sleeve portion having
      i. a central aperture extending through said main body adapted to receive said sleeve portion;
      ii. a groove about said central aperture extending partially through said main body;
      iii. a locking aperture extending through said main body and extending into said groove;
      iv. a locking mechanism extending through said locking aperture so as to allow all or some portion of said locking mechanism to extend through said groove, with such locking mechanism adapted to be reversibly removed;
   d. a second body portion having
      i. a perimeter wall, a bottom end, and a top end;
      ii. at least one side opening extending partially or completely through said perimeter wall and positioned so as to allow said locking mechanism of said main body portion to extend into said at least one side opening;
      iii. said bottom end having a portion extending into said groove of said main body portion, said bottom end being adapted to rotate with respect to said main body portion between an unlocked position wherein said locking aperture and said at least one side opening are not aligned and a locked position wherein said locking aperture and said at least one side opening are aligned; and
      iv. said top end having an opening.

2. The steering column according to claim 1 wherein said opening of said top end of said second body portion is shaped to receive said terminal end portion of said steering shaft portion and is fixed to said terminal end portion so as to cause said second body portion to rotate along with the rotation of said steering shaft portion.

3. The steering column according to claim 1 wherein said terminal end portion of said steering shaft has one or more splines and said opening of said top end of said second body portion is shaped so as to receive the splined terminal end portion so as to cause said second body portion to rotate along with the rotation of said steering shaft portion.

4. The steering column according to claim 1 wherein said top end of said second body portion comprises a removable portion that includes said opening of said top end.

5. The steering column according to claim 1 wherein said central aperture is defined by at least one removable portion wherein said main body portion is shaped so as to hold said at least one removable portion within the main body portion.

6. The steering column according to claim 1 wherein said severable main body portion comprises a first portion and a second portion wherein said first portion is fixed to said second portion.

7. The steering column according to claim 1 wherein said terminal end portion of said steering shaft has one or more splines and second body portion is fixed to an adaptor having an aperture shaped so as to receive the splined terminal end portion so as to cause said second body portion to rotate along with the rotation of said steering shaft portion.

8. A locking system comprising:
   a. a severable main body portion having
      i. a central aperture extending through said main body;
      ii. a groove about said central aperture extending partially through said main body;
      iii. a locking aperture extending through said main body and extending into said groove;
      iv. a locking mechanism extending through said locking aperture so as to allow all or some portion of said locking mechanism to extend through said groove, with such locking mechanism adapted to be reversibly removed;
   b. a second body portion having
      i. a perimeter wall, a bottom end, and a top end;
      ii. at least one side opening extending partially or completely through said perimeter wall and positioned so as to allow said locking mechanism of said main body portion to extend into said at least one side opening;
      iii. said bottom end having a portion extending into said groove of said main body portion, said bottom end being adapted to rotate with respect to said main body portion between an unlocked position wherein said locking aperture and said at least one side opening are not aligned and a locked position wherein said locking aperture and said at least one side opening are aligned; and
      iv. said top end having an opening.

9. The locking system according to claim 8 wherein said wherein said opening of said top end is shaped to receive a terminal end portion of a rotatable steering shaft and is fixed to said terminal end portion so as to cause said second body portion to rotate along with the rotation of said terminal end portion.

10. The locking system according to claim 8 wherein said terminal bore is shaped so as to receive a splined terminal end portion of a rotatable column so as to cause said second body portion to rotate along with the rotation of said terminal end portion.

11. The locking system according to claim 8 wherein said top end of said second body portion comprises a removable portion that includes said opening of said top end.

12. The locking system according to claim 8 wherein said central bore is defined by at least one removable portion wherein said main body portion is shaped so as to hold said at least one removable portion within the main body portion.

13. The locking system according to claim 8 wherein said severable main body portion comprises a first portion and a second portion wherein said first portion is fixed to said second portion.

* * * * *